April 8, 1924.
T. G. BRIGGS
1,489,233
SPRING WHEEL
Filed Oct. 4, 1922
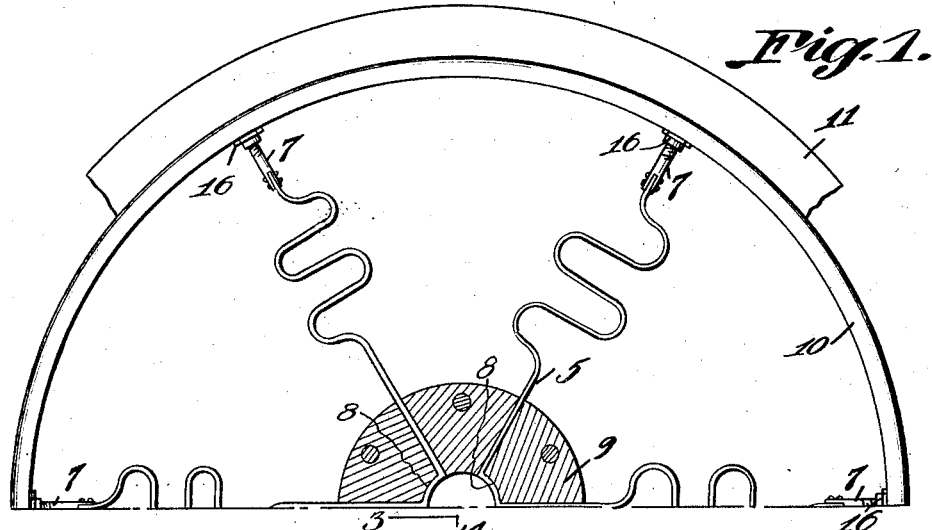
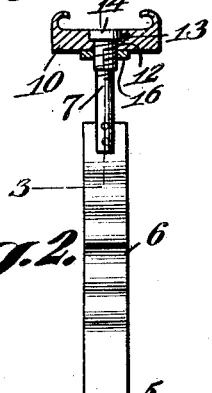
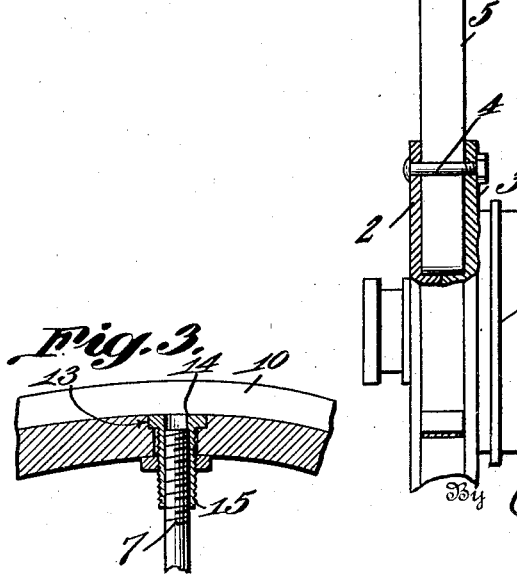
T. G. Briggs,
Inventor
By C. A. Snow & Co.
Attorney Patented Apr. 8, 1924.

1,489,233

UNITED STATES PATENT OFFICE.

THOMAS G. BRIGGS, OF HIGH ROCK, NORTH CAROLINA.

SPRING WHEEL.

Application filed October 4, 1922. Serial No. 592,339.

*To all whom it may concern:*

Be it known that I, THOMAS G. BRIGGS, a citizen of the United States, residing at High Rock, in the county of Davidson and State of North Carolina, have invented a new and useful Spring Wheel, of which the following is a specification.

This invention relates to spring wheels, one of its objects being to provide a wheel having spring spokes of novel construction which can be securely connected to the hub and rim portions of the wheel.

Another object is to provide spokes which will not easily become displaced, and which will share the absorption of shocks with the pneumatic tire to be used on the rim of the wheel.

Another object is to provide simple means for adjusting the compression of the spokes.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of a portion of a spring wheel embodying the present improvements, the filling blocks being shown in section.

Figure 2 is a transverse section through a portion of the wheel.

Figure 3 is a section on line 3—3, Figure 2.

Referring to the figures by characters of reference 1 designates the hub which is of usual construction, the same including opposed members 2 and 3 adapted to be clamped against opposite faces of spokes by means of bolts 4. Instead of using the ordinary wooden or metal spokes, the present invention utilizes spring spokes arranged in pairs. Each spoke consists of a strip 5 of spring metal provided, between its ends, with a sinuous portion 6, one end of the strip being riveted or otherwise fastened to a threaded stem 7. The other or inner end of each spoke merges through a short arcuate portion 8 with the inner end of the next adjoining spoke so that the spokes are thus arranged in pairs, the spokes of each pair being integral with the connecting arcuate portion 8. The inner end portions of the spokes extend between the members 2 and 3 of the hub and segmental filling blocks 9 are interposed between the members 2 and 3 and between the inner end portions of the spokes so as properly to fill the hub and space the spokes. The bolts 4 are extended through these blocks and serve to hold the parts properly assembled.

The rim 10 of the wheel is adapted to be engaged by a pneumatic tire 11 or the like and is provided, at regular intervals, with openings 12 extending therethrogh and having counterbored outer end portions 13. These counterbores are adapted to receive heads 14 formed at the outer ends of sleeves 15 which are formed with interior and exterior threads. The exterior threads do not engage the rim 10 but are engaged by locking nuts 16 which, when tightened on the sleeves, serve to fasten the sleeves securely to the rim. The threaded stems 7 engage the interior threads in the sleeves, and by loosening the nuts 16 the sleeves can be rotated so as to shift the stems 7 longitudinally and reduce or increase the compression of the sinuous portions 6 of the spokes.

What is claimed is:—

In a spring wheel the combination with opposed hub members, of spring strips bent to form spaced spokes and a connection between the inner ends of the spokes, each of said spokes being provided, between its ends, with a sinuous resilient portion, segmental filling blocks secured between the hub members and spacing the inner portions of the spokes, and adjustable connections between the outer ends of the spokes and the rim of the wheel.

In testimony that I claim the foregoing as my own, I have hereto affixed my signature in the presence of two witnesses.

THOMAS G. BRIGGS.

Witnesses:
 JAS. E. WILLIAMS,
 JOHN F. SMITH.